Feb. 12, 1952

B. E. WILLIAMS 2,585,360

TOTE CART

Filed Feb. 11, 1949

INVENTOR.
Beverly E. Williams
BY R. G. Story
ATTORNEY

Patented Feb. 12, 1952

2,585,360

UNITED STATES PATENT OFFICE 2,585,360

TOTE CART

Beverly E. Williams, Chicago, Ill., assignor to Swift & Company, Chicago, Ill., a corporation of Illinois Application February 11, 1949, Serial No. 75,913

5 Claims. (Cl. 62—95)

This invention relates to a carrying means for perishable products and more particularly to a refrigerated tote cart. It is an object of this invention to provide an improved method and means for storing and transporting perishable products.

It is another object of this invention to provide an improved method and means for refrigerating and storing perishable products passing over a loading dock.

It is another object of this invention to provide an improved method and means for refrigerating perishable products while it is being held on a loading dock and in transit.

It is another object of this invention to provide an improved means for transporting a variety of perishable products which must be stored at different temperatures.

It is another object of this invention to provide an improved method for loading perishable products into a transit van.

It is another object of this invention to provide a method for storing packaged perishable products during shipment.

It is another object of this invention to provide a method for storing packaged perishable products whereby it may be uniformly cooled during transit.

It is another object of this invention to provide a tote cart structure including refrigerating surfaces.

It is another object of this invention to provide an improved tote cart structure for shipping packaged frozen product.

It is another object of this invention to provide an improved tote cart structure for shipping several kinds of products in the same van or railroad car, the cart structure making it possible to store the different types of product at different temperatures during shipment.

These and other objects will appear more fully from the specification below.

In the drawings:

Fig. 3 shows several of the carts of this invention in a modern type of refrigerated railroad car or the like.

Figure 1:
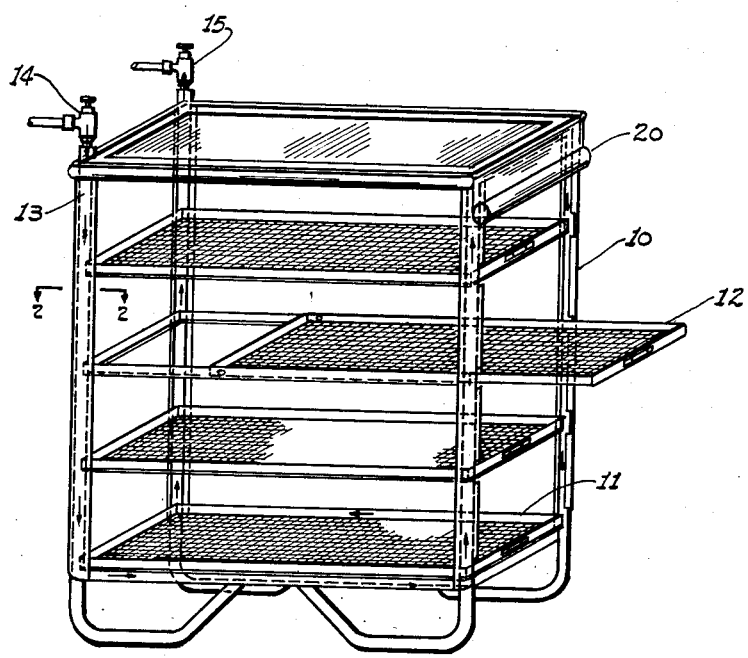
Fig. 1 is a perspective view of a tote cart showing the preferred form of this invention.
Figure 2:
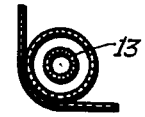
Fig. 2 is a view taken on line 2—2 of Fig. 1.

The frozen food industry has made great strides recently and this has necessitated the development of special equipment for properly freezing and storing the product. In the past, conventional refrigerating means have been used for the transportation of the frozen product from the packing plant to the retail outlet, and the present invention has been made to provide improved shipping means for more efficiently shipping frozen foods and other perishable products requiring substantially uniform temperature conditions for the best storage thereof.

This invention is concerned with an improved tote cart which may be loaded in a refrigerated warehouse, and includes a structure for providing a holdover icing effect to preserve product stored thereon. A further aspect of the invention is inherent in the means for connecting the tote cart icing structure to a refrigerating system built into the transit van means whereby to intermittently or continuously recondition the means for producing the refrigerating effect during transit.

The herein disclosed tote cart includes a tubular framework which may be filled with a eutectic solution, and the tubes of the various carts may be filled with different eutectic solutions in order to maintain different storage temperatures on each cart for the stored product. Suitable enclosing screens are provided, and when the screens are positioned so as to enclose the product stored on the cart, a uniform temperature equivalent to the melting temperature of the eutectic solution may be maintained throughout the closed storage space of the cart. If desired, however, the screens may be raised during transit and the product carried on all of the carts may be exposed to the single large refrigerating means built into the transit van or railroad car structure.

Referring more particularly to the drawings, a preferred form of the structure is shown which embodies the principles of the present invention. The tote cart here shown has a frame supporting structure made up of a system of interconnected vertical tubes 10 and horizontal tubes 11 for supporting shelves 1, which may be and preferably are mounted to be moved in and out in the manner of a drawer. The tubes 10 are rather large in diameter and are adapted to be filled with a eutectic solution which may be frozen to provide a holdover refrigerating effect. The eutectic solution may be frozen initially by subjecting the frame structure to a low temperature as in a refrigerated warehouse, but preferably a small tube 13 is arranged concentrically within the framework of the tote cart, the small tube 13 forming the evaporator element a refrigerating means.

The tube 13 may be connected into a refrigerating system to form the evaporator and liquid refrigerant may be delivered to the evaporator through valve 14. The liquid refrigerant will flow into tube 13 to extract heat from the eutectic solution as it evaporates, and the gaseous refrigerant may then be returned to the compressor system through valve 15.

Suitable flexible screening means 20 may be mounted on each side of the tote cart, which screens may be pulled down to close in the storage space of the tote cart when desired. The screens 20 are preferably made of a fabric impervious to the flow of the air and heat whereby, after a cool atmosphere has been established in the storage zone on the tote cart, this condition may be preserved.

Figure 3:
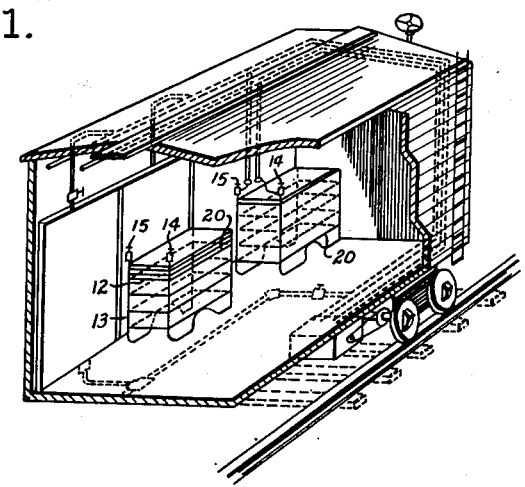

Fig. 3 shows several of the tote carts of this invention in position in a transit van where one of the carts is connected up to a refrigerating system mounted on the vehicle. Another of the carts within the van has its screens rolled up so that the product on the cart is exposed to the cold wall refrigerating surface within the van. Refrigerated transit vans of the type here shown are disclosed in my patents, Numbers 2,496,189; 2,521,272; and 2,527,782 issued January 31, 1950; September 5, 1950 and October 31, 1951, respectively, and my earlier issued Patent No. 2,381,796 of August 7, 1945. The tote carts exposed to the refrigerating surfaces in the van have their screens rolled up so that the product stored on the shelves on the cart is all uniformly exposed to the ambient temperature maintained within the van. The other cart which is connected up to the refrigerating system of the vehicle has its screens rolled down so that the product stored on this cart may be subjected to a lower temperature equivalent to the melting point of the particular eutectic solution used to fill the tubular cart frame.

The cart structure of this invention is normally used for transporting perishable product from a refrigerated warehouse to a van and serves the particular purpose of protecting the product from exposure to the surrounding atmosphere while it is being moved across the loading dock from the warehouse to the van. In cases where of necessity a frozen product is left exposed on a hot dock for a short while, the product may be damaged by thawing. However, such a possibility is precluded when the screen-enclosed form of the present invention is used.

The tote cart structure may be loaded with perishable product under refrigerating temperatures, and the screens may then be drawn down to surround the product. The temperature within the cart cannot thereafter rise substantially above the melting point of the eutectic solution held in the frame of the cart as long as any of the eutectic remains frozen, and thus the product is kept refrigerated while it is held on the cart, as when it is being transported across the loading dock of a warehouse to a refrigerated railroad car. The refrigerated tote cart may even be allowed to remain on the loading dock for a short time, and yet the stored product will be efficiently refrigerated until it can be moved to the refrigerated van or railroad car structure.

Once the cart has been moved into the van, it may be connected to the refrigerating system of the van, or the screens can be rolled up to expose the stored product to the cold wall refrigerating means built into the van. In cases where mixed shipments are to be made, that is, where some product must be stored at a lower temperature than the bulk of the shipment, the particular product which must be held at a colder temperature is stored on the tote carts connected to a refrigerant supply or mechanical system operated during movement of the van in transit. In this instance, the screens are drawn and the eutectic solution within the frame structure of the tote cart is frozen. This produces a lower temperature within the confines of the enclosed tote cart so that this product is exposed to the necessary lower temperature during transit.

The shelf structure of the tote cart itself serves to minimize air circulation and tends to even out temperature variations which might otherwise occur. The elimination of temperature variations during shipment of packaged frozen food products is of particular importance in that the product is stored in a better manner whereby barometric pumping is substantially eliminated. The tote cart structure herein described thus very nearly approaches the establishment of ideal conditions for the shipment of perishable product. This is true for the further reason that there can be no thawing of frozen product and refreezing thereof, which action tends to dehydrate the product.

The above invention has been shown in the drawings for use in connection with a railroad van structure, but it is obvious that the tote cart can be used for truck trailer units, in airplane transportation, and other forms of refrigerated van structures. Many modifications may occur to those skilled in the art which will fall within the scope of the following claims.

I claim:

1. The combination of a refrigerated transit van and storage means for perishable product, the van having refrigerating equipment associated therewith, said equipment including means for circulating a refrigerant comprising a plurality of tote carts to hold the perishable product, each of said carts having a tubular frame structure, the tubes being constructed to contain a eutectic solution, each cart having a circuit to receive a circulating refrigerant, said circuit being associated with the tubes whereby the eutectic solution may be frozen when a refrigerant is circulated therein, and means to connect said circuit to said refrigerating equipment to freeze said eutectic.

2. The combination of a refrigerated transit van and storage means for perishable product, the van having refrigerating equipment associated therewith, said equipment including means for circulating a refrigerant comprising a plurality of tote carts to hold the perishable product, each of said carts having a tubular frame structure, the tubes being constructed to contain a eutectic solution, each cart having a circuit to receive a circulating refrigerant, said circuit being associated with the tubes whereby the eutectic solution may be frozen when a refrigerant is circulated therein, means to connect said circuit to said refrigerating equipment to freeze said eutectic, and means to enclose each of said carts including the tubular frame structure whereby the tubes filled with the frozen eutectic solution are operative to maintain the enclosed tote cart space at the melting temperature of the eutectic solution.

3. A portable storage means for temporarily holding chilled or frozen perishable products during shipment from one place to another, comprising a tote cart having a generally tubular frame, interconnected for fluid circulation, a eutectic solution in said frame, means circulated through said frame to cool said solution to an extent necessary to freeze it, and removable screens for enclosing said cart.

4. A portable storage means for temporarily holding chilled or frozen perishable products during shipment from one place to another, comprising a tote cart having a generally tubular frame, interconnected for fluid circulation, a eutectic solution in said frame, means circulated through said frame to cool said solution to an extent necessary to freeze it, a plurality of generally imperforate shelves supported on said frame, and removable screens for enclosing said cart.

5. A portable storage means for temporarily holding chilled or frozen perishable products during shipment from one place to another, comprising a tote cart having a generally tubular frame, a eutectic solution in said frame, a circuit associated with said frame to receive a refrigerant adapted to cool said solution to an extent necessary to freeze it, and removable screens for enclosing said cart.

BEVERLY E. WILLIAMS.

REFERENCES CITED

The following references are of record in the file of this patent:

UNITED STATES PATENTS

| Number | Name | Date |
| --- | --- | --- |
| 832,625 | Ryan | Oct. 6, 1906 |
| 898,970 | Cook | Sept. 15, 1908 |
| 1,641,192 | Olin | Sept. 6, 1927 |
| 1,719,526 | Trojahn | July 2, 1929 |
| 1,755,147 | Bilham et al. | Apr. 15, 1930 |
| 2,069,481 | Rott | Feb. 2, 1937 |